United States Patent [19]
Ahmad et al.

[11] Patent Number: 5,644,314
[45] Date of Patent: Jul. 1, 1997

[54] PORTABLE GEOPHYSICAL SYSTEM USING AN INVERSE COLLOCATION-TYPE METEHODOLOGY

[75] Inventors: Falih H. Ahmad, Clinton, Miss.; James A. Evans, Tallulah, La.

[73] Assignee: The United States of America as represented by the Secretary of the Army, Washington, D.C.

[21] Appl. No.: 625,080

[22] Filed: Mar. 29, 1996

[51] Int. Cl.$^6$ .................................................. G01S 13/04
[52] U.S. Cl. .......................... 342/22; 342/192; 342/196
[58] Field of Search ........................... 342/22, 192, 196, 342/197

[56] References Cited

U.S. PATENT DOCUMENTS

| | | | |
|---|---|---|---|
| 4,706,031 | 11/1987 | Michiguchi et al. | 342/22 X |
| 4,937,580 | 6/1990 | Wills | 342/22 |
| 5,280,284 | 1/1994 | Johler | 342/22 |
| 5,325,095 | 6/1994 | Vadnais et al. | 342/22 |
| 5,327,139 | 7/1994 | Johnson | 342/22 |
| 5,446,461 | 8/1995 | Frazier | 342/22 |
| 5,486,833 | 1/1996 | Barrett | 342/204 |
| 5,499,029 | 3/1996 | Bashforth et al. | 342/22 |
| 5,557,277 | 9/1996 | Tricoles et al. | 342/22 |
| 5,592,170 | 1/1997 | Price et al. | 342/22 |

*Primary Examiner*—John B. Sotomayor
*Attorney, Agent, or Firm*—Luther A. Marsh

[57] ABSTRACT

The invention pertains to a hand-held or vehicle mountable portable processor based high resolution radar system for detecting and identifying an object by using high resolution radar. In particular, the invention concerns using radio waves for identifying a depth and material of an object within a media. This system can perform target and media identification in real-time. This process is achieved by the system's processor where the media identification results can be visually displayed on an output unit. The generated carrier signal used in the radar system is an exponentially decaying superimposed direct and alternating signal. The frequency of the carrier signal can be in the microwave region. The system performs analog to digital (A/D) conversion using integrated circuitry whose sampling rate is in the same as the carrier signal transmission rate. In addition, Fourier and Hilbert transforms of the observed signal is generated for frequency domain analysis of the observed object to be identified and a profile inversion methodology for real time analysis. To achieve high resolution results, digital codes such as Barker, Welti, or Frank codes are used in the processor. The carrier signal is coded using a digitally controlled phase shifter. Power usage by the instant invention's radar system is low. The profile inversion methodology is a real time based analysis.

6 Claims, 1 Drawing Sheet

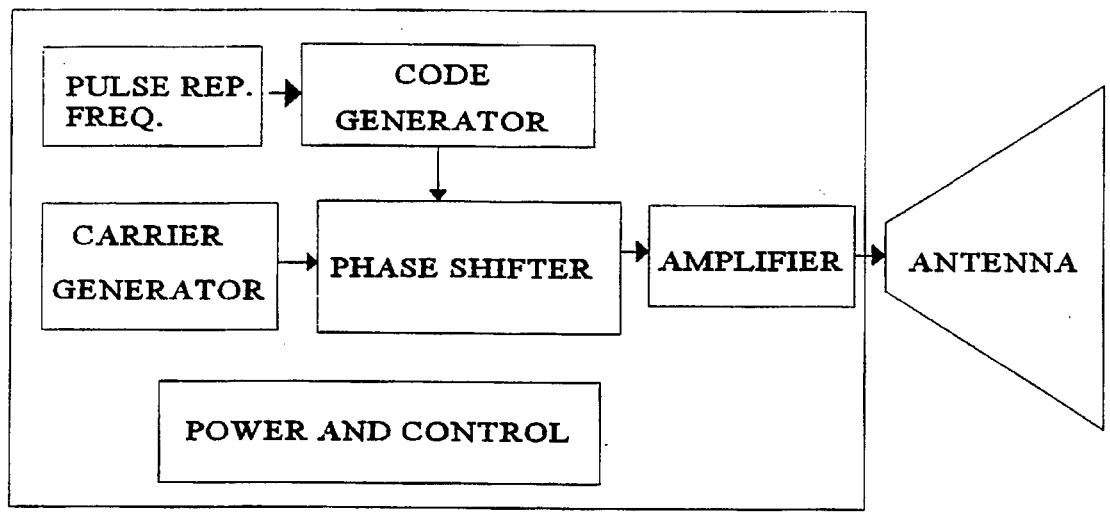
FIG. (1)
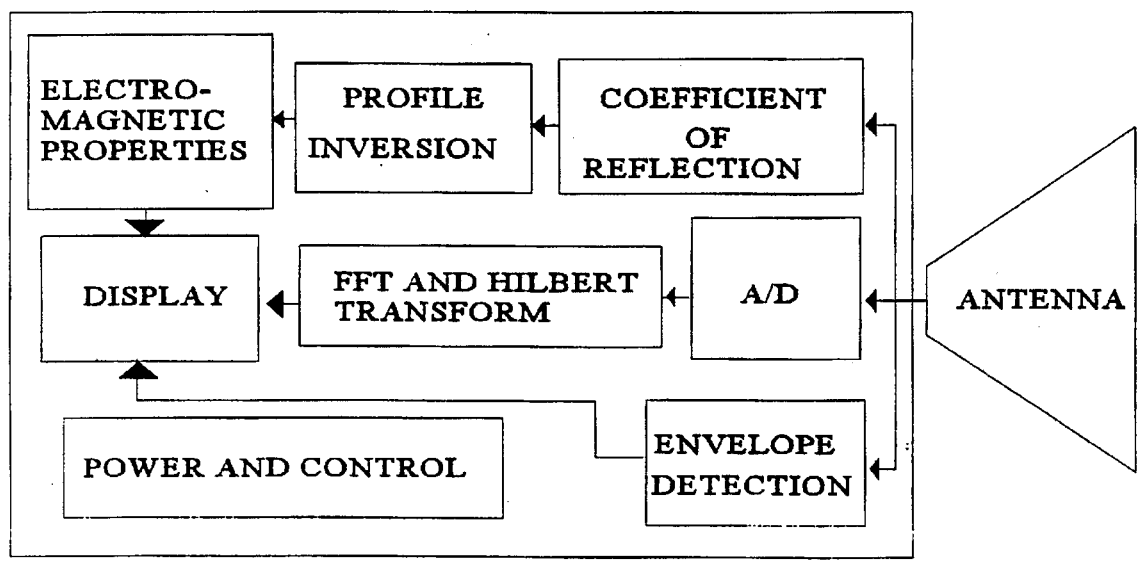
FIG. (2)

1

PORTABLE GEOPHYSICAL SYSTEM USING AN INVERSE COLLOCATION-TYPE METEHODOLOGY

STATEMENT OF GOVERNMENT INTEREST

The invention described herein may be manufactured and used by or for the United States Government for governmental purposes without the payment of any royalties thereon.

FIELD OF THE INVENTION

The invention pertains to a system and method for detecting and identifying an object by using high resolution radar. More particularly, the invention concerns using radio waves for identifying a depth and material of an object within the earth, although application of the invention is not limited thereto.

BACKGROUND OF THE INVENTION

Much effort has been spent in improving methods used to remotely characterize media, which can be referred to as media identification. In general, media identification is attained using electromagnetic energy. wherein radar is used accordingly. In particular, high resolution radar is a preferred means of performing media identification which may include the detection and identification of subsurface mines as well as be applied to measure moisture contents in media.

Carrier signals presently used in radar systems are sinusoidal. These carriers can be coded or non-coded depending on the type of radar used. Codes used in high resolution radar typically use Barker, Frank, Costas and Welti based codes. Generally, carriers of ground penetrating radars are not coded. Moreover, most ground penetrating radars are non-portable and not packagable in a hand-held radar unit for subsurface surveys. In most current ground penetrating radars, the antenna is designed to slide on the surface of the medium being tested. This action inherently limits their use. Another method for this intended application is the use of synthetic aperture radar which is a high resolution radar. This type of radar system takes advantage of the forward motion of an airborne radar system for producing an equivalent antenna array that may be thousands of feet long. Moreover, the beam width of such this equivalent array is roughly half that of a real array of the same length. The outputs of the array are synthesized in a signal processor from the returns received by the real radar antenna over period of up to several seconds or more.

Prior art teachings of apparatus intended for subsurface media identification is U.S. Pat. No. 4,937,580 entitled "Geophysical Radar Apparatus and Method" by Wills. Another prior teaching of apparatus intended for subsurface media identification using physical and electrical properties of a dielectric object using sequential spatial and spectral microwave data is U.S. Pat. No. 5,327,139 entitled "1D Microwave Holographic Sensor" by Johnson. Both of these prior art teachings do not use the current invention's efficient profile inversion methodology for identifying subsurface objects that requires less power usage.

Media identification generally occurs in three parts: detection, discrimination, and recognition. Feature extraction from the reflected electromagnetic energy is performed in the latter for three reasons (1) to optimize recognition system performance, (2) to reduce the amount of information to be processed, and (3) to ensure robustness or invariance of the recognition system. For example, a set of features may actually be composed of the fast Fourier transform of the reflected energy, target's radar cross section (RCS) and the permittivity, velocity of propagation, permeability, susceptibility, and conductivity profiles of the medium in which the target exists. While the target's RCS is produced through the application of various prior radar methods, application of inverse scattering theory is utilized to construct the mentioned profiles. Electromagnetic target identification has numerous practical applications in subsurface/ground-penetrating radar, geophysical sensing and nondestructive testing. The portable high resolution radar emits an incident wave and observes a reflected wave to detect the electromagnetic properties and presence of objects. Also, in the operations of nondestructive testing of media and remote sensing, it is desired to apply target or pattern recognition for the purpose of identifying objects, defects or any other kind of targets and discriminate between them and clutter. In this case the electromagnetic profiles mentioned above are considered important parts of the recognition process. These profiles are used in the discrimination and identification stages. From a physical point of view, different bodies, media or materials possess different profiles of electromagnetic properties as seen from models of such properties. For example, a charge model for permittivity of a dispersive medium has an equation of motion for the charge bounded by harmonic force and acted on by an electric field and where the effects of magnetic forces can be neglected. The permittivity of this dispersive media is described by a function of i) the number of the molecules per unit volume, ii) the number of the electrons per molecule and iii) a damping constant. Thus, the permittivity profile of every material is unique. Accordingly, media recognition processes that utilize reflection, conductivity, permittivity and permeability profiles provide a reliable way for media identification. Improvement in the speed by which the results are generated through this process and their accuracy is logically vital for any military mission such as the automatic detection and identification of subsurface mines. A portable high resolution radar can be used to generate electromagnetic profiles which are utilized for automatic recognition processes. High resolution radar can be achieve by transmitting a low-peak-power, coded pulse of long duration and then compressing on reception. A radar system that incorporates pulse compression processing provides improvement in the detection performance, reduction in the mutual interference and an increase in the system operational flexibility. The instant invention satisfies these requirements by providing a portable hand-held, relatively low power consuming, processor based high resolution radar system for generating electromagnetic profile of a medium and subsurface object (s) contained therein.

SUMMARY OF THE INVENTION

The invention pertains to a hand-held or vehicle mountable portable processor based high resolution radar system for detecting and identifying an object by using high resolution radar. In particular, the invention concerns using radio waves for identifying a depth and material of an object within a media. This system can perform target and media identification in real-time. This process is achieved by the system's processor where the media identification results can be visually displayed on an output unit. The generated carrier signal used in the radar system is an exponentially decaying superimposed direct and alternating signal. The frequency of the carrier signal can be in the microwave region. The system performs analog to digital (A/D) conversion using integrated circuitry whose sampling rate is in the same as the carrier signal transmission rate. In addition, Fourier and Hilbert transforms of the observed signal is generated for frequency domain analysis of the observed object to be identified and a profile inversion methodology for real time analysis. To achieve high resolution results, digital codes such as Barker, Welti, or Frank codes are used in the processor. The carrier signal is coded using a digitally controlled phase shifter. Power usage by the instant invention's radar system is low. The profile inversion methodology is a real time based analysis.

BRIEF DESCRIPTION OF THE DRAWING

FIG. (1) shows in a block diagram the system's high resolution transmitter.

FIG. (2) shows in a block diagram the system's high resolution receiver.

DETAILED DESCRIPTION & OPERATION

The portable high resolution radar is of four parts: a transmitter, a receiver, a processor and dc power supply source. FIGS. (1) and (2) Many of the following components are shown and described in the U.S. Pat. No. 4,937,580 entitled "Geophysical Radar Apparatus and Method" by Wills which is hereby incorporated by reference except for variations noted below.

Transmitter: A block diagram of the transmitter is shown in FIG. (1). The transmitter with appropriate signal transmission hardware includes the following items:

An input keypad for selecting a desired code generation.

A pulse repetition frequency carrier that is a unit configured as a 200 MHz oscillator and is very stable whose output signal is a square wave.

A carrier generating circuit unit which is an underdamped oscillator circuit with narrow band filtering capability which produces an exponentially decaying direct and alternating (sinusoidal) signals that are superimposed. The carrier signal is gated ON only during transmission of a desired code. These codes include Costas, Barker, Welti, or Frank codes. This feature conserves power usage where a hand-held unit can be implemented.

A phase shifter that is a digitally controlled.

A power amplifier can typically be a six-dB power gain device with a 50-ohm output impedance characteristic.

A transmitting antenna that is a narrow beam-width antenna.

Receiver: A block diagram of the receiver is shown in FIG. (2). The receiver is a processor controlled unit with associated signal transmission devices as follows comprising:

A receiving antenna that is a narrow beam-width antenna. The transmitter antenna is similar to the receiving antenna.

An envelope detector that is a sub-circuit which uses a positive-intrinsic-negative diode for detecting the envelope of the carrier. This circuit includes a correlator capability for cross-correlating the envelope of the received signal with the original code word to produce a high resolution time compressed version of the received envelope.

A circuit to generate the complex coefficient of reflection function of the observed signal which is first digitized at multiples of the carrier signal rate using the high speed A/D convertor and signal processor. This signal is generated by comparing the received signal with the transmitted signal. The complex reflection coefficient in addition to the impulse response are generated in the system.

A circuit to perform inversion and generate electromagnetic profiles using the collocation-type methodology discussed below. The returned signal is used in the inversion scheme to generate the electromagnetic profiles. This circuit utilizes the methodology discussed below of: i) inputting the response received by the receiver, i.e. the coefficient of reflection coefficient which is complex; ii) generating polynomials for the returned signal and its respective derivatives; iii) generating a set of algebraic equations with unknowns that represent an electromagnetic profile of the medium and subsurface object(s); and iv) solving these equation's unknowns for this profile.

A high-speed analog to digital convertor of the received signal is performed at the carrier signal frequency. There is no down conversion in this system.

A Fourier and Hilbert transform unit converts the A/D signal into a frequency domain data for material classification.

An exponentially decaying carrier signal is generated in the transmitter and encoded by a code previously selected by the user. The code is selected through the keypad where the codes are stored in the processor unit. As the carrier is generated, commands from the processor are issued to the digitally converted phase shifter to encode the carrier. Accordingly, for every bit of the code, the carrier's phase is changed. The duration in time of every bit of the code is much smaller than the duration of the transmitted carrier. The encoded carrier is amplified by a power amplifier and fed to a transmitting antenna. A reflected signal is received by the receiving antenna and three major operations are performed on it. (1) Envelope detection to extract the envelope of the returned carrier and generate a base band signal characteristic of the target. (2) The returned signal is utilized to generate the input signal to the inversion methodology. This function is then used as an input to a methodology routine within the processor in which the profile inversion is performed. As a result electromagnetic profiles of the medium such as permittivity, conductivity, permeability and susceptibility are generated for output display. (3) The returned signal is digitized to generate its Fourier and Hilbert transforms. The outputs from these three operations are features of the medium that is being identified.

Inverse Profile Collocation-Type Methodology

When a radiation field interacts with an object, the scattered field carries information about the object's structure and composition. The inverse problem is posed by the retrieval of material parameters from measurements of a scattered field. There are many practical applications in remote sensing fields as diverse as medical imaging, non-destructive evaluation, radar, and sonar imaging. Because of the complexity of the scattering interaction, reconstructed images of the scattering object obtained in real time are at best of dubious qualitative accuracy. In the context of electromagnetic (EM) scattering when the illuminated object is a lossless dielectric, accurate and quantitative inverse solution are, as yet, only available for certain types of profiles. Most solutions are computationally intensive and are not attractive for real-time implementation.

In the case of electromagnetic wave propagation, the physical basis for the dispersive phenomenon lies in the following constitutive relationship which is given in "Classical Electrodynamics, 2nd ed., John Wiley and Sons, New York, 1975" by J. D. Jackson:

$$D(x,t) = \epsilon_0 \left[ E(x,t) + \int_0^\infty G(s)E(x,t-s)ds \right], \quad (1)$$

Where $\epsilon_0$ is the permittivity of free space. Equation (1) is a relationship between the displacement field $D(x,t)$ at a point in a homogeneous medium, the susceptibility kernel G of the medium, and the past history of the electromagnetic field at that point, $E(x,s)$ for $-\infty < s \leq t$.

The inverse problem considered in this method involves determining the dispersive properties of a homogeneous medium, that is, the susceptibility kernel G, by means of scattering methods. This inverse problem and its solution are formulated in the time domain. Generation of the function $G(t)$ in the time domain is equivalent to determining the complex permittivity in the frequency domain. Accordingly, this method of solving the inverse problem does not depend on Fourier transformation. Most previous work on inverse problems for dispersive electric media was carried out in the frequency domain, with measurements being made at a fixed frequency, but varying the angle of incidence. Thus, the dispersive character of the problem is in fact not a central issue in the solution methods. Here we introduce a direct computational method for solving the inverse problem. Our approach is based on a spectral collocation method given in "Spectral Method in Fluid Dynamics, Springer, New York, 1988" by C. Canuto, M. Y. Hussaini, and T. A. Zang. In our method we construct the $N^{th}$-degree interpolating polynomials to approximate the susceptibility kernel. These polynomials are defined by using Legendre-Gauss-Lobatto points as the collocation points and Lagrange polynomials as the trial functions.

Consider a homogeneous, isotropic, dispersive, medium bounded by the planes $z=0$ and $z=L>0$. An electromagnetic plane wave is launched in the region $z<0$. This impinges normally on the medium, giving rise to a left-moving reflected wave and a transient field within the medium. Assuming $E(z,t)$ denotes a transverse component of the electric field by using Equation (1), we have:

$$E_{zz} - \frac{1}{c^2}\left[ E_{tt} + \partial_t^2 \int_0^\infty G(s)E(z,t-s)ds \right] = 0, \quad (2)$$

$$0 < z < L,$$

where $c^{-2} = \epsilon_0 \mu_0$, with $\mu_0$ being the permeability of free space. In the region $z<0$ the field $E(z,t)$ can be split into incident and reflected fields. A convoloutional relationship between the incident and reflected fields exists through the impulse response $R(z,t)$. Accordingly, the inverse problem is formulated in a form of an equation consisting of the impulse response, its derivatives, and the susceptibility kernel. This equation is $$2cR_z = 4R_t + G'(t) + G'(0)[2R + R*R] + G' * [2R + R*R], \quad (3)$$

$$0 < z < L, \; 0 \leq t \leq T$$

$$R(L,t) = 0, \; 0 \leq t \leq T,$$

$$R(z,0^+) = -\frac{1}{4} G(0^+)$$

where the prime=d/dt and the asterisk operation denotes convolution in time.

We apply Legendre-Gauss-Lobatto nodes to Equation (3) and generate $$\frac{4c}{L} \sum_{i=0}^{N} \sum_{j=0}^{N} r_{ij}\phi'_i(\beta_n)\phi_j(\alpha) = \frac{8}{T} \sum_{j=0}^{N} r_{nj}\phi'_j(\alpha) + \quad (4)$$

$$\frac{2}{T} \sum_{i=0}^{N} g_i\phi'_i(\alpha) + 2g_0 \sum_{j=0}^{N} r_{nj}\phi_j(\alpha) +$$

$$g_0 \sum_{i=0}^{N}\sum_{j=0}^{N} r_{ni}r_{nj} \int_0^t \phi_i(u)\phi_j(\alpha-u)du +$$

$$\frac{4}{T} \sum_{i=0}^{N}\sum_{j=0}^{N} g_i r_{nj} \int_0^t \phi'_i(u)\phi_j(\alpha-u)du +$$

$$\frac{2}{T} \sum_{i=0}^{N}\sum_{k=0}^{N}\sum_{j=0}^{N} g_i r_{nk} r_{nj} \times \left[ \phi'_i(\alpha) * \int_0^t \phi_k(u)\phi_j(\alpha-u)du \right].$$

where r and g are the values of the impulse response and the susceptibility kernel at the collocation points, respectively and $\phi$ is the trial function. We implement Equation (4) in the hardware of the radar system as an inversion scheme to generate susceptibility profiles of media.

We applied this method and solved two examples. In both examples the impulse response is known, whereas $G(t)$ needs to be estimated. For the purpose of this demonstration, we had to solve the direct problem in order to generate the impulse response. We then used this function to solve the inverse problem and generate the corresponding $G(t)$.

EXAMPLE 1

A two-resonance model for the electron contribution to the permittivity is sued in this example. Thus G is given as:

$$G(t) = e^{-0.2t}\sin(1.6\pi t) + 0.5e^{-0.5t}\sin(6\pi t)$$

The depth of the medium is taken as $L=0.8$ and the chosen time is $T=6$. We calculate the approximate value $G^N(t_n)$ for $N=4$. In Table 1, we report values of the approximate and exact susceptibility function at Legendre-Gauss-Lobatto nodes.

| $t_n$ $0 \leq n \leq 4$ | $G^4(t_n)$ | $G(t_n)$ |
|---|---|---|
| −1.000000 | 0.0014 | 0.0000 |
| −0.654654 | −0.4799 | −0.4808 |
| 0.000000 | 0.3228 | 0.3226 |
| 0.654654 | −0.0992 | −0.0996 |
| 1.000000 | −0.2855 | −0.2864 |

EXAMPLE 2

In this example, the medium is semi-infinite, the impulse response is given and the time is taken as $T=10$. The exact solution is given by:

$$G(t) = -2(\sin t + t\cos t).$$

In Table 2, we given values of the approximate and exact susceptibility functions at Legendre-Gauss-Lobatto nodes for $N=8$.

| $0 \leq n \leq 8$ $t_n$ | $G^8(t_n)$ | $G(t_n)$ |
|---|---|---|
| −1 | 0.0012 | 0.0000 |
| −0.899757 | −1.8410 | −1.8401 |
| −0.677186 | −1.8495 | −1.8584 |
| −0.363117 | 6.4341 | 6.4486 |
| 0 | −0.9205 | −0.9187 |
| 0.363117 | −12.7680 | −12.7597 |
| 0.677186 | 6.7687 | 6.7832 |
| 0.899757 | 19.1291 | 19.0935 |
| 1 | 17.8995 | 17.8695 |

While this invention has been described in terms of a preferred embodiment, it is understood that it is capable of further modification and adaptation of the invention following in general the principle of the invention and including such departures from the present disclosure as come within the known or customary practice in the art to which the invention pertains and may be applied to the central features set forth, and fall within the scope of the invention and the appended claims.

We claim:

1. A portable processor based system for detecting an object with a transmitting/receiving signal means for transmitting an electromagnetic wave and receiving as an observation signal a reflected wave which is an electromagnetic wave returned from the object with input means and output display means comprising: the transmitting signal means including:

a means for producing a pulse repetition frequency carrier signal that includes an oscillator thereby producing a stable output signal that is a square wave;

a means for producing a carrier generating signal that includes a circuit with under-damped oscillator with narrow band filtering capability thereby producing an exponentially decaying dc signal along with a superimposed exponentially decaying sinusoidal carrier signal, the carrier generating signal is gated ON only during transmission of a desired code thereby minimizing system power usage;

a means for producing a phase shifting of the a modulated carrier signal with the desired code that is a digitally controlled phase shift keying modulator unit;

a means for amplifying the transmitted modulated carrier signal towards the observed objects through a narrow beam-width antenna;

the receiving signal means including:

a narrow beam-width antenna;

a means for observation signal envelope detection which includes a positive-intrinsic-negative diode for detecting this envelope along with a means for cross-correlating the envelope of the observation signal with the desired code used thereby producing a high-resolution time compressed version of the observation signal envelope that generates a base band signal characteristic of the object observed for output display by the by the output means;

a means for generating an input signal to a means for performing a collocation-type inversion method from the observation signal which is first digitized at multiples of the carrier signal's rate using an analog to digital (A/D) convertor;

a means for performing real-time inversion and generation of desired electromagnetic profiles that includes the processor for implementing the collocation-type inversion method wherein the input signal is inputted into the means for performing the inversion method that: i) generates polynomials and its' derivatives from the input signal; if) generates a set of algebraic equations with unknowns being the desired profiles; and iii) solves the set of algebraic equations for the unknowns which produces the desired electromagnetic profiles of the object being observed;

a means for frequency domain analysis of the A/D signals generated using a Fourier and Hilbert transform unit for material classification of the object; and the display means outputs electromagnetic profiles of the object observed of the objects permittivity, conductivity, permeability and susceptibility.

2. The system of claim 1 wherein the means for performing inversion and generation of desired electromagnetic profiles using the collocation-type inversion method uses an impulse response signal as the input signal for is inputting to the inversion method that sequentially: i) generates polynomials and its' derivatives from the impulse response signal for constructing an approximate susceptibility profile defined by Legendre-Gauss-Labatto points as collocation points and Lagrange polynomials as trial functions; ii) generates a set of algebraic equations with unknowns being the desired susceptibility profile; and iii) solves these set of algebraic equations for their unknowns which produces the desired susceptibility profile of the object being observed for display by the output means.

3. The system of claim 1 wherein the desired code is Barker code.

4. The system of claim 1 wherein the desired code is Welti code.

5. The system of claim 1 wherein the desired code is Frank code.

6. The system of claim 1 wherein the desired code is Costas code.

* * * * *